US005499523A

United States Patent [19]
Ginzburg

[11] Patent Number: 5,499,523
[45] Date of Patent: Mar. 19, 1996

[54] METHOD FOR PRODUCING METAL STRIPS HAVING DIFFERENT THICKNESSES FROM A SINGLE SLAB

[75] Inventor: Vladimir B. Ginzburg, Pittsburgh, Pa.

[73] Assignees: Danieli United, Inc.; International Rolling Mill Consultants, Inc., both of Pittsburgh, Pa.

[21] Appl. No.: 183,085

[22] Filed: Jan. 14, 1994

Related U.S. Application Data

[63] Continuation-in-part of Ser. No. 139,389, Oct. 19, 1993.

[51] Int. Cl.⁶ ........................................................ B21B 1/32
[52] U.S. Cl. ............................... 72/203; 72/229; 72/365.2
[58] Field of Search ............................... 72/203, 229, 231, 72/365.2, 366.2

[56] References Cited

U.S. PATENT DOCUMENTS

| | | | |
|---|---|---|---|
| 555,972 | 3/1896 | Ring | 72/203 |
| 1,857,670 | 5/1932 | Steckel . | |
| 1,918,968 | 7/1933 | Keeney et al. . | |
| 1,977,214 | 10/1934 | Steckel | 80/2 |
| 2,072,122 | 3/1937 | Montgomery | 80/32 |
| 2,078,005 | 4/1937 | Lloyd | 80/32 |
| 2,084,469 | 6/1937 | Wean | 80/2 |
| 2,087,065 | 7/1937 | Montgomery | 80/60 |
| 2,091,340 | 8/1937 | Sutherland | 80/60 |
| 2,123,291 | 7/1938 | Smithmans | 80/33 |
| 2,162,407 | 6/1939 | Manion | 80/31.1 |
| 2,214,107 | 9/1940 | Montgomery | 80/60 |
| 2,658,741 | 11/1953 | Schmidt et al. | 263/3 |
| 2,675,720 | 4/1954 | Ferm | 80/32 |
| 2,937,821 | 5/1960 | O'Brien | 242/78.5 |

(List continued on next page.)

FOREIGN PATENT DOCUMENTS

| | | |
|---|---|---|
| 0317841 | 6/1989 | European Pat. Off. ............. 72/203 |
| 0735568 | 11/1932 | France . |
| 0966931 | 10/1950 | France . |
| 0967117 | 10/1950 | France . |
| 1284459 | 1/1962 | France . |
| 1308895 | 10/1962 | France . |
| 0383531 | 11/1932 | United Kingdom . |
| 0668064 | 3/1952 | United Kingdom . |
| 0918005 | 2/1963 | United Kingdom . |
| 1269648 | 4/1972 | United Kingdom . |
| 2030491 | 4/1980 | United Kingdom . |

OTHER PUBLICATIONS

K. Wakatsuki et al., "Development Of Plate Rolling Technology At NSC OITA Works", *Proceedings of the 4th International Steel Rolling Conference: The Science and Technology of Flat Rolling*, vol. 1, Deauville, France, Jun. 1–3, 1987, pp. C3.1–3.11.

T. Ohtsubo et al., "18. Development Of Differential-Thickness Steel Plate Rolling Technology", *Proceedings of the 5th International Rolling Conference: Dimensional Control in Rolling Mills*, Institute of Metals, London, Sep. 11–13, 1990, pp. 166–174.

*Primary Examiner*—Lowell A. Larson
*Assistant Examiner*—Thomas C. Schoeffler
*Attorney, Agent, or Firm*—Panitch Schwarze Jacobs & Nadel

[57] ABSTRACT

The present invention relates to a method of controlling the productivity of a rolling plant having at least first and second rolling stands by processing a single slab of metal having a thickness, into metal strips having different thicknesses less than the thickness of the slab in accordance with strip output requirements of the rolling plant. The output requirements for strips having at least first and second different thicknesses to be produced by the rolling plant is determined. The slab is then rolled in a first rolling stand to reduce the slab thickness to produce a transfer bar. The transfer bar is sheared into first and second transfer bar portions such that the first and second transfer bar portions are sized to correspond to the output requirements for the first and second strips, respectively. The first transfer bar portion is then rolled in one of the first and second rolling stands to reduce the first transfer bar portion to produce a first strip having a first thickness.

10 Claims, 8 Drawing Sheets

U.S. PATENT DOCUMENTS

| | | | |
|---|---|---|---|
| 3,331,232 | 7/1967 | King | 72/365 |
| 3,368,378 | 2/1968 | O'Brien | 72/148 |
| 3,613,426 | 10/1971 | Adair et al. | 72/202 |
| 3,805,570 | 4/1974 | Smith | 72/146 |
| 4,308,739 | 1/1982 | Tippins | 72/229 |
| 4,344,309 | 8/1982 | Matsuzaki | 72/199 |
| 4,348,882 | 9/1982 | Tippins | 72/202 |
| 4,430,876 | 2/1984 | Ginzburg | 72/234 |
| 4,503,697 | 3/1985 | Tippins et al. | 72/202 |
| 4,580,428 | 4/1986 | Brettbacher et al. | 72/226 |
| 4,658,363 | 4/1987 | Tippins et al. | 364/472 |
| 4,782,683 | 11/1988 | Tippins et al. | 72/229 |
| 5,125,250 | 6/1992 | Sun | 72/8 |
| 5,140,837 | 8/1992 | Thomas et al. | 72/229 |
| 5,150,597 | 9/1992 | Sekiya et al. | 72/229 |

METHOD FOR PRODUCING METAL STRIPS HAVING DIFFERENT THICKNESSES FROM A SINGLE SLAB

CROSS-REFERENCE TO RELATED APPLICATION

This application is a continuation in part of U.S. patent application Ser. No. 08/139,389, filed Oct. 19, 1993.

FIELD OF THE INVENTION

The present invention relates to a method for producing hot rolled metal strip and, more particularly, to a method of controlling the productivity of a rolling plant by processing a single slab of metal into metal strips having different thicknesses in accordance with the strip output requirements of the rolling plant.

BACKGROUND OF THE INVENTION

Hot rolled steel plate has generally been produced by use of a reversing plate mill rolling from "pattern" slabs to plate. Reversing plate mills specifically dedicated to rolling "pattern" slabs to plate are generally used for producing wider and thicker plate as compared to a hot strip mill product. It is the usual practice to produce plate on a single stand or a two-stand reversing mill. Each combination of thickness, width, and length of plate rolled from the mill requires a properly proportioned "pattern" slab with the appropriate volume of metal. The slabs are reduced to plates by passing them back and forth through the mill. It is usual to cross roll a slab to achieve the desired plate width. Thereafter, the rolled plates are flattened hot on a leveling machine, transferred to a cooling bed for cooling and subsequently side sheared and end sheared to finish plate dimensions. This reduction normally takes place on a four-high hot reversing plate mill, although it is also common to utilize an additional two-high or four-high hot reversing mill upstream of the four-high reversing mill to increase productivity by having two slabs on line at a time.

The use of only "pattern" slabs in the mill is problematic. Since each plate size is made from a corresponding pattern slab, the reheat furnace must accommodate a wide range of slab sizes to produce the product mix, thereby making heating efficiency and uniformity more difficult. Further, the slab producing facility, whether it be a continuous caster or a blooming or slabbing mill must turn out a large number of small size slabs for subsequent processing into the plates. For example, a typical 112-inch wide plate mill requires approximately 30,000 slabs for each 100,000 tons of plate production. This is further compounded by the typical market demand for carbon steel plate wherein approximately 50% of the demand is for plate which is one-half inch thick or less. To meet this market, the reversing plate mill must roll many slabs (2 to 3 tons) at a resultant low production rate and with a low product yield.

The slabs must be obtained from a slabbing mill or continuous caster, cut to "pattern" dimensions, marshalled in the plate mill slab yard and charged into the plate mill furnace in the proper rolling sequence. Therefore, in addition to low production rate and yield, substantial costs are involved in the repeated handling and marshalling of many small slabs.

One attempt to improve the productivity of reversing plate mills involves a process for continuous conversion of an extra large slab, at least 32 tons in weight, into a number of plates on a plate mill. The process involves heating the slab to a desired rolling temperature. The heated slab is then passed back and forth through a hot reversing mill to obtain a workpiece of desired intermediate thickness. After each pass through the hot reversing mill, the workpiece is coiled and heated within a coiler furnace until the workpiece has been reduced to a desired plate thickness. The workpiece is then decoiled from one of the coiler furnaces and fed to an in-line shear where it is sheared into a number of plates of desired length.

By using only extra large slabs, the productivity of the reversing plate mill is increased and manufacturing costs are lowered. This is achieved because the reversing plate mill requires a smaller building, and less equipment, manpower and services than an equivalent two-stand facility and, thus, requires appreciable lower capital expenditure. In addition, by processing only extra large slabs, a substantial increase in product yield is achieved, which lowers unit manufacturing costs and considerable raw material, energy and other resources.

While rolling only large slabs minimized the problems associated with rolling only pattern slabs, the problem of storing the finished excess product in inventory offset some of the savings by rolling large slabs. U.S. Pat. No. 4,658,363 attempts to reach a middle ground between rolling only pattern slabs or extra large slabs, by rolling both extra large slabs, on the order of 30 to 40 tons each, and pattern slabs, on the order of 2 to 11 tons each. A decision is made to process extra large slabs, to process pattern slabs or a combination of both extra large and pattern slabs to supply the plate requirements for the next determinable period of time, called the horizon period in the '363 patent. That is, a decision is made to either roll the pattern plates in flat form as a series of single plates from a corresponding series of pattern slabs or to roll from a single extra large slab a coil of metal to the described dimensions of the total number of pattern plates and then shear the pattern plates from the coil. Several plates are rolled in coil form from a single slab when more than 60% of the coil can be utilized for the ordered pattern plates during the horizon period. The remaining portion of the coil, if any, is stored in inventory. Otherwise pattern slabs are used to satisfy the pattern plate requirements. The value of 60% is considered as a break-even point in which the savings due to an increase in yield are offset by losses due to the storage of the finished product in the inventory. While both pattern and extra large slabs are rolled, only a single thickness product is rolled from each slab.

The process of rolling both pattern slabs and large slabs in a reversing plate mill is problematic in that it is still necessary to select and feed the appropriately sized slabs to the reversing plate mill. Further, where a decision is made to roll a large slab, but the slab will produce a number of plates exceeding the number ordered, it is necessary to place the remaining plates in inventory. Thus, there are losses due to the costs of storing finished product in inventory.

Hence, a need has arisen for a method of controlling the hot reversing mill wherein a significant amount of excess finished product is not generated and, therefore, does not have to be inventoried. A need has also arisen for a method for controlling a hot reversing mill wherein the particular size of the slab to be rolled is generally uniform to reduce the costs associated with handling and feeding different-sized slabs into the mill. The present invention satisfies these needs.

The present invention overcomes the shortcomings of the state of the art and achieves further advantages which will be apparent after reviewing the foregoing and following specification.

SUMMARY OF THE INVENTION

One aspect of the present invention is a method for producing metal strips having different thicknesses from a single slab of metal having a thickness greater than that of the strips comprising the steps of rolling the slab in a first rolling stand to reduce the slab thickness to produce a transfer bar having a first thickness; shearing the transfer bar into first and second transfer bar portions; rolling the first transfer bar portion in a second rolling stand to reduce the first transfer bar portion to a first strip having a second thickness different from the first thickness.

Another aspect of the present invention is a method for producing metal strips having different thicknesses from a single slab of metal having a thickness greater than that of the strips comprising the steps of rolling the slab in a first rolling stand to reduce the slab thickness to produce a transfer bar having a first intermediate thickness; rolling the transfer bar in a second rolling stand to reduce the transfer bar to a second intermediate thickness which is less than the first intermediate thickness; shearing the transfer bar into first and second transfer bar portions; and rolling the first transfer bar portion in the second rolling stand to reduce the first transfer bar portion to a first strip having a thickness different from the second intermediate thickness.

Another aspect of the present invention is a method of producing metal strips having different thicknesses from a single slab of metal having a thickness greater than that of the strips comprising the steps of rolling the slab in a first rolling stand to reduce the slab thickness to produce a transfer bar having a first intermediate thickness; rolling the transfer bar in a second rolling stand to reduce the transfer bar to a second intermediate thickness which is less than the first intermediate thickness; shearing the transfer bar into first, second and third transfer bar portions; rolling the first transfer bar portion in the first rolling stand to reduce the first transfer bar portion to a first strip having a first thickness; and rolling the second transfer bar portion in the second rolling stand to reduce the second transfer bar portion to a second strip having a second thickness different from the first thickness.

Another aspect of the present invention is a method of controlling the productivity of a rolling plant having at least first and second rolling stands by processing a single slab of metal having a thickness, into metal strips having different thicknesses less than the thickness of the slab in accordance with strip output requirements of the rolling plant, comprising the steps of determining the output requirements for strips having at least first and second different thicknesses to be produced by the rolling plant; rolling the slab in the first rolling stand to reduce the slab thickness to produce a transfer bar; shearing the transfer bar into first and second transfer portions such that the first and second transfer bar portions are sized to correspond to the output requirements for the first and second strips, respectively; and rolling the first transfer bar portion in one of the first and second rolling stands to reduce the first transfer bar portion to produce a first strip having a first thickness.

The present invention also provides for shearing the transfer bar into first and second transfer bar portions such that the first transfer bar portion is sized to produce less than or equal to the output requirements for the first strip and the second transfer bar portion is sized to produce less than or equal to the output requirements of the second strip.

BRIEF DESCRIPTION OF THE DRAWINGS

The foregoing summary, as well as the following detailed description of preferred embodiments of the invention, will be better understood when read in conjunction with the appended drawings, where like numerals indicate like elements throughout both figures. For the purpose of illustrating the invention, there is shown in the drawings embodiments which are presently preferred. It should be understood, however, that the invention is not limited to the precise arrangements and instrumentalities shown. In the drawings.

DETAILED DESCRIPTION OF THE PREFERRED EMBODIMENTS

Figure 1:
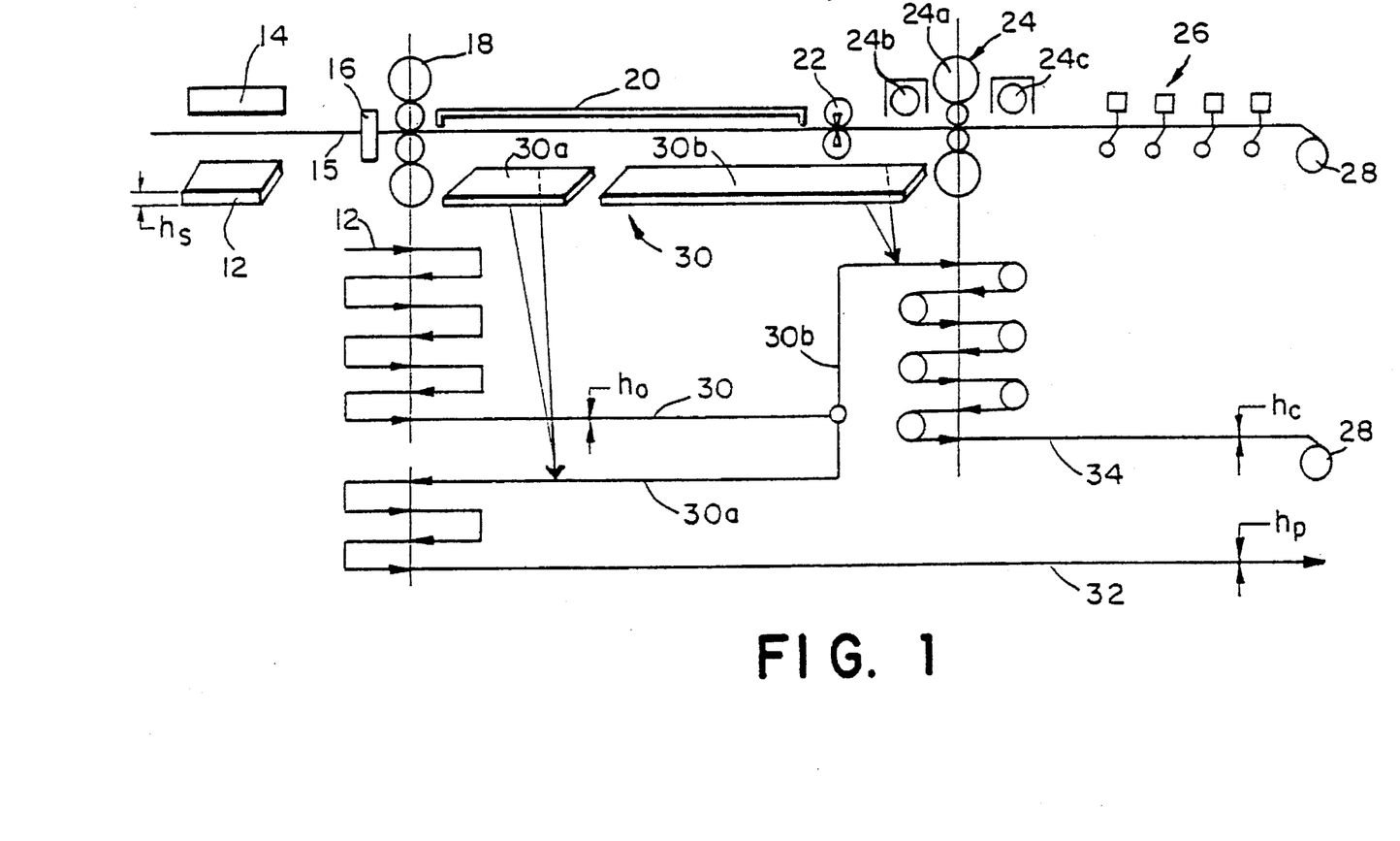
FIG. 1 is a schematic diagram, in elevational view, of a rolling plant and pass roll schedule in accordance with a first method of the present invention.

Referring to the drawings in detail, there is shown in FIG. 1 a rolling plant, generally designated 10, which is used to practice a method for producing metal strips having different thicknesses from a single slab 12 of metal having a thickness greater than that of the strips in accordance with the present invention. More particularly, the present invention is directed to a method for controlling the productivity of the rolling plant 10 by processing the single slab 12 into metal strips having thicknesses which are less than the thickness of the single slab 12 in accordance with the strip output requirements of the rolling plant 10.

The rolling plant 10 includes, inter alia, in series, a reheat furnace 14, a vertical edger 16, a first rolling stand 18, heat retention panels 20, a shear 22, a second rolling stand 24, a runout table coolant system 26 and a downcoiler 28, all of which are conventional and well understood by those skilled in the art.

In the first method of the present invention the output requirements of the rolling plant 10 for strips (not shown) having at least first and second different thicknesses to be produced by the rolling plant 10 is determined. The rolling plant 10 is capable of producing many different-thickness products in accordance typically with outstanding purchase orders for many different products. To determine the output requirements it is necessary to review and analyze the purchase orders for each metal strip which has been ordered, but not yet delivered, including, but not limited to, the type of metal, the plate dimensions, and the total number of each size and type plate required. As used herein the term "strip" means a product having a final thickness which may be further processed by shearing into a number of final products. For instance, a strip could be in coil form and later be sheared into a number of final products or in plate form and later be sheared into a number of final products. While the following description of the present method is directed to first and second different-thickness strips to be produced by the rolling plant 10, those skilled in the art will understand in view of this disclosure that the present invention is applicable to the output requirements of the rolling plant 10 for all of its different-thickness products.

In determining the output requirements for the rolling plant 10, it is not necessary to review the output requirements for a particular time period. That is, it is not necessary to review the output requirements of the rolling plant 10 for a particular period of time, for instance two weeks. The output requirements of the rolling plant 10 can be analyzed over any number of different time periods, including one day to several months, depending upon the due dates set forth in the purchase orders, availability of raw materials, work schedules and other parameters.

Referring now to FIG. 1, a slab 12 is positioned to be reduced in thickness by the first rolling stand 18. The single slab 12 is preferably relatively large, as compared to a "pattern" slab. In the first method, it is preferred that the single slab 12 be about 20 to 30 tons in weight. However, those skilled in the art will understand in view of this disclosure that slabs of varying weight, such as 3 to 50 tons, may be processed in the rolling plant 10, without departing from the spirit and scope of the invention. While different-sized slabs can be processed by the rolling plant 10, it is preferred that the rolling plant receive uniformly sized slabs 12 to reduce the cost associated with repeated handling and marshalling of many different-sized slabs.

In the first method the slabs are obtained from a slabbing mill (not shown). The slabbing mill is located remote from the rolling plant 10 such that the slabs to be processed by the rolling plant 10 are stored or inventoried in a slab yard (not shown) proximate the rolling plant 10. After a slab has been selected for processing in the rolling plant 10, it is placed in the reheat furnace 14 to raise the temperature of the slab to the point where it is workable in the rolling plant 10. Those skilled in the art will understand in view of this disclosure that the present invention is not limited to any particular method of providing slabs to the rolling plant 10. For instance, the slabbing mill could be located proximate to the rolling plant 10 and the slabs could be transferred directly to the passline, through the use of a tunnel furnace (not shown), instead of the reheat furnace 14. In addition, a continuous caster (not shown) could also be used to produce slabs for the rolling mill 10 in a manner well understood by those skilled in the art.

After the slab 12 has been placed in the reheat furnace 14, it is transferred to a rollout table (not shown), forming a portion of a passline 15, and moved toward the first rolling stand 18 in a conventional manner. A vertical edger 16 edges the longitudinal sides of the slab 12 prior to processing the slab 12 in the first rolling stand 18. The slab 12 having a thickness $h_s$ is then rolled in the first rolling stand 18 to reduce the slab thickness and produce a transfer bar 30 having an intermediate thickness $h_o$ less than thickness $h_s$. In the first method, it is preferred that the first rolling stand 18 be a reversing rolling stand and the slab 12 be passed back and forth through the first rolling stand 18 to reduce the slab thickness and produce the transfer bar 30. The thickness $h_o$ of the transfer bar 30 is selected to correspond to the strip output requirements of the rolling plant 10, as described in more detail hereinafter. Seven passes are shown schematically (aligned under the first rolling stand 18) of the slab 12 through the first rolling stand 18 to reduce the slab 12 to the transfer bar 30. Each pass is represented by a horizontal line having an arrow which indicates the direction of travel of the slab 12 through the first rolling stand 18. The vertical line between some of the passes indicates that the slab 12 has stopped travelling for the purpose of reversing its direction back toward the first rolling stand 18, without coiling. This schematic illustration is used throughout the figures in the same manner.

The number of passes through the first rolling stand 18 is selected in accordance with the strip output requirements of the rolling plant 10 to achieve the appropriate thickness $h_o$ of the transfer bar 30. Accordingly, the present invention is not limited to any particular number of passes through the first rolling stand 18 and the number of passes could vary between one and thirty, for example.

In the first method, the first rolling stand 18 is preferably a reversing rougher mill which is comprised of a single four-high rolling stand. However, those skilled in the art will understand in view of this disclosure that the first rolling stand 18 could be anywhere from a two- to six-high rolling stand without departing from the spirit and scope of the invention. Similarly, while only a single rolling stand is shown, those skilled in the art will understand in view of this disclosure that a series of rolling stands could be used, for instance from three to seven stands.

After the transfer bar 30 has been produced having the thickness $h_o$, it exits the first rolling stand 18 and is passed beneath the heat retention panels 20 along the passline 15. The heat retention panels 20 maintain the heat of the transfer bar 30 for further processing, in a manner well understood by those skilled in the art. The transfer bar 30 then exits the heat retention panels 20 and is sheared into first and second transfer bar portions 30a, 30b, respectively, by the shear 22. In the first method, the first and second transfer bar portions 30a, 30b are sized to correspond to the output requirements for the first and second strips, respectively.

For the purpose of explanation, the first strip will be considered to be a strip from which plate products are made, having a thickness $h_p$, while the second strip will be considered to be a strip from which sheets or products that can be cut or sheared from a coil are made, having a thickness of $h_c$. In general $h_c$ is less than $h_p$. This explanation is only for the purpose of illustration, as either the first or second strip product can be thicker than the other, depending upon the output requirements.

More particularly, the first transfer bar portion 30a is sized to produce less than or equal to the output requirements for the first strip and the second transfer bar portion 30b is sized to produce less than or equal to the output requirements for the second strip. In this manner, the strips produced by the rolling plant never exceed the output requirements of the rolling plant 10. Thus, excess finished product is not generated by the method of the present invention and, therefore, it is not necessary to maintain an inventory and incur the costs associated with maintaining an inventory.

It is determined whether the transfer bar 30 will produce more than the output requirements for a particular strip thickness. If the transfer bar 30 will produce less than or equal to the output requirements for a particular strip thickness, then the transfer bar 30 is processed without shearing it into the first and second transfer bar portions 30a, 30b, since the output strip requirements of the rolling plant 10 will not be exceeded. The unsheared transfer bar 30 can be processed by the first rolling stand 18 or the second rolling stand 24, in a manner well understood by those skilled in the art.

If it is determined that the transfer bar 30 will produce more than the output requirements for a particular strip thickness, it is then preferred to shear the transfer bar 30 transversely into the first and second transfer bar portions 30a, 30b. The particular point at which the transfer bar 30 is sheared can be anywhere along the longitudinal length of the transfer bar 30 so long as the transfer bar 30 is separated into at least first and second transfer bar portions 30a, 30b which are sized to produce less than or equal to the output requirements for the first and second strips. While FIG. 1 shows the first transfer bar portion 30a being relatively smaller than the second transfer bar portion 30b, those skilled in the art, in view of this disclosure, will understand that the second transfer bar portion 30b can be smaller than the first transfer bar portion 30a. The second transfer bar portion 30b is shown as being approximately 70% of the transfer bar 30 merely to reflect that, for instance, approximately 70% of a hypothetical order requires the final product to be in coil form.

The amount of a particular thickness strip which can be generated from a transfer bar or slab can be readily calculated by those of ordinary skill in the art. Since the size of the slab 12 and/or transfer bar 30 is known, and the output requirements for the rolling plant 10 are known, the precise position to shear the transfer bar 30 is easily calculated by those of ordinary skill in the art.

After the transfer bar 30 has been sheared into the first transfer bar portion 30a and the second transfer bar portion 30b, the first transfer bar portion 30a is rolled in the first rolling stand 18 to reduce the first transfer bar portion 30a to a first strip 32 having a first thickness $h_p$. More particularly, the first transfer bar portion 30a is passed back and forth through the first rolling stand 18 a sufficient number of passes to reduce the first transfer bar portion 30a to the first strip 32 having the first thickness $h_p$. In the first method, it is preferred that the first strip 32 be generally suitable for shearing or otherwise dividing the product into plates. The number of passes through the first rolling stand 18 is dictated by the intermediate thickness $h_o$ of the first transfer bar portion 30a and the first thickness $h_p$ of the first strip 32 in a manner well understood by those skilled in the art.

After the first transfer bar portion 30a has been reduced to the first strip 32, it can be removed from the rolling plant 10 by removing the first strip 32 from the passline 15 between the first rolling stand 18 and the second rolling stand 24 by a transfer table (not shown). If the first strip 32 is removed from the passline 15 between the first rolling stand 18 and the second rolling stand 24, cooling beds (not shown) can be provided between the first and second rolling stands 18, 24 in a manner well understood by those skilled in the art. Alternatively, the final strip product 32 can be passed through the second rolling stand 24, cooled by the coolant system 26, coiled in the downcoiler 28, if appropriate, and sheared into pattern plates. If the first strip 32 is passed through the second rolling stand 24, the second rolling stand can be operative to perform a final thickness reduction pass of the first strip 32 or the second rolling stand can be inoperative or open to not further reduce the thickness of the first strip 32.

The second transfer bar portion 30b is rolled in a second rolling stand 24 to reduce the second transfer bar portion 30b to a second strip 34 having a second thickness $h_c$ different from the first thickness $h_p$ and less than intermediate thickness $h_o$. In the first method, the second rolling stand 24 is a reversing rolling stand. The second transfer bar portion 30b is passed back and forth through the second rolling stand 24 a sufficient number of passes to reduce the second transfer bar portion 30b to the second strip 34 having the second thickness $h_c$, such that the second strip 34 is coilable. In the first method, it is preferred that the second thickness $h_c$ of the second strip 34 be less than the first thickness $h_p$ of the first strip 32. However, it is understood by those skilled in the art that the relative thicknesses between the first strip and second strip 32, 34 is not pertinent to the present invention and that both products could be rolled to plate or coil form.

In the first method, it is preferred that the second rolling stand 24 be part of a Steckel mill having a single four-high rolling stand 24a positioned between a first, upstream coiler furnace 24b and a second, downstream coiler furnace 24c. This permits the second transfer bar portion 30b to be coiled and heated within one of the first and second coiler furnaces 24b, 24c after each pass until the second transfer bar portion 30b is reduced to the second strip thickness $h_c$.

Those skilled in the art will understand in view of this disclosure, that the present invention is not limited to any particular rolling stand configuration for the second rolling stand 24. For instance, the second rolling stand 24 could be a series of one or several two- through six-high rolling stands or a combination thereof, without departing from the spirit and scope of the invention. Similarly, the number of passes back and forth through the second rolling stand 24 is selected in accordance with the difference in thickness between the intermediate thickness $h_o$ of the second transfer bar portion 30b and the second thickness $h_c$ of the second strip 34, in a manner well understood by those skilled in the art. Seven passes, for example, with coiling after the first six passes, are illustrated schematically below the second rolling stand 24. Coiling in the coiling furnaces 24b and 24c is schematically indicated by the circles at the end of the passes.

After the second strip 34 exits the second rolling stand 24, it is cooled by a conventional runout table coolant system 26 and coiled in a downcoiler 28 so that it is ready for further processing, such as shearing the strips to any desired size, or shipping.

In the first method relating to FIG. 1, it is preferred that the rolling of the first transfer bar portion 30a in the first rolling stand 18 and the rolling of the second transfer bar portion 30b in the second rolling stand 24 be carried out at least partially simultaneously to increase the overall productivity of the rolling plant 10. That is, where the first rolling stand 18 would normally remain idle as the second rolling stand 24 processes the transfer bar 30, the first and second transfer bar portions 30a, 30b are separately and at least partially simultaneously processed in the first and second rolling stands 18, 24. This increases the overall productivity of the rolling plant 10, since neither rolling stand 18 nor 24 is idle while the other of the rolling stands 18, 24 is operating.

While the foregoing description of the first method in accordance with the present invention describes separating the transfer bar 30 into first and second transfer bar portions 30a, 30b, those skilled in the art will understand in view of this disclosure that the transfer bar 30 can be separated into any number of transfer bar portions, so long as they are sized to meet less than or equal to the output requirements of the rolling plant 10 for a particular strip thickness. Furthermore, those skilled in the art will understand in view of this disclosure that the present invention is not limited to processing any of the transfer bar portions in either the first or second rolling stand 18, 24. That is, the first transfer bar portion 30a could be processed in the second rolling stand 24 to coil form and the second transfer bar portion 30b could be processed in the first rolling stand 18 to plate form, without departing from the spirit and scope of the invention.

Figure 2:
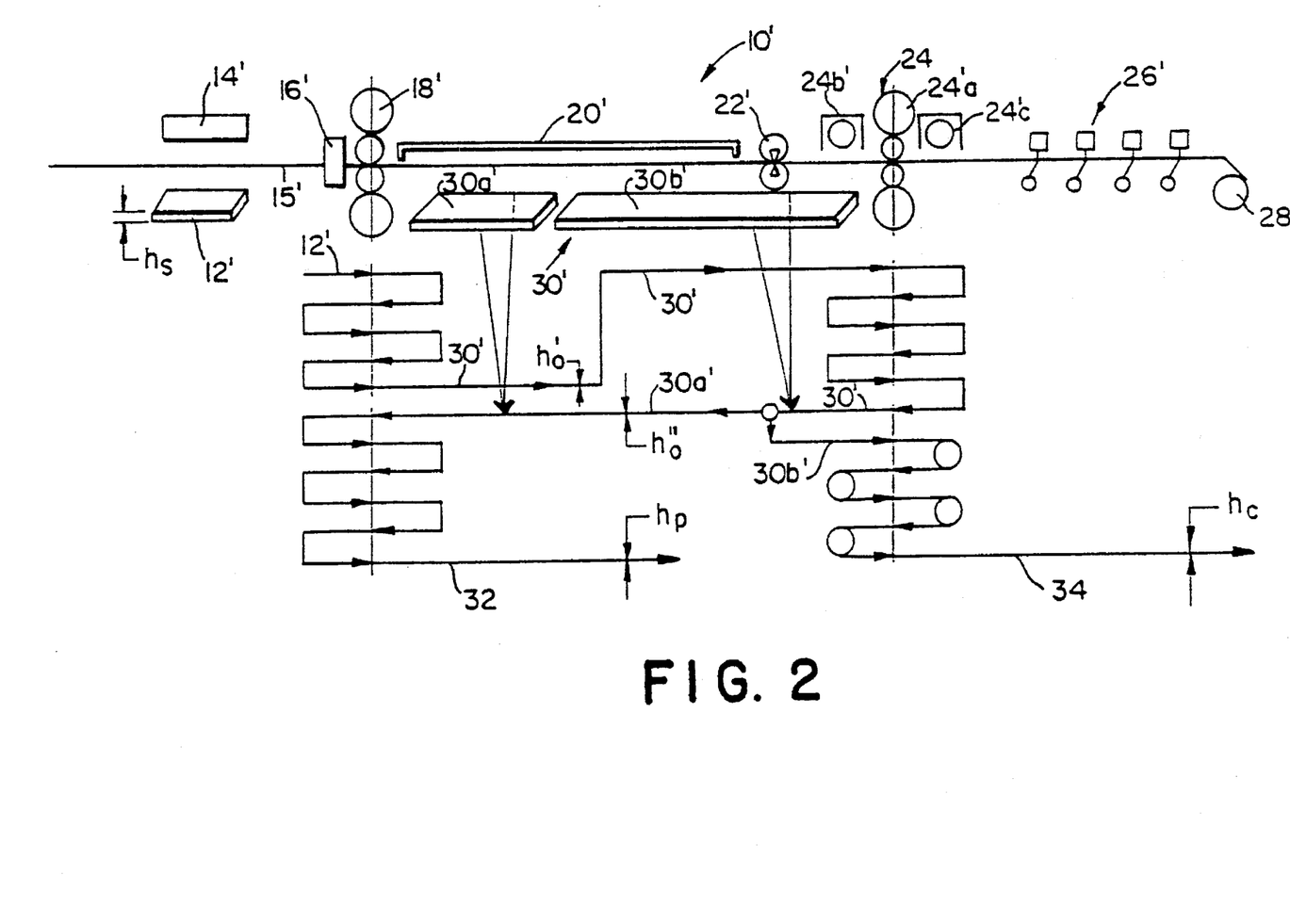
FIG. 2 is a schematic diagram, in elevational view, of a rolling plant and pass roll schedule in accordance with a second method of the present invention.

Referring now to FIG. 2, there is shown a rolling plant 10' which is generally identical to the rolling plant 10 shown in FIG. 1. Accordingly, further description of the rolling plant 10' shown in FIG. 2 is omitted since primed numerals are used in FIG. 2 to identify like elements identified by unprimed numerals in FIG. 1. The second method of the present invention is generally identical to the first method of the present invention described above, except for the difference described below.

After the first transfer bar 30' exits the first rolling stand 18' and has been reduced to a first intermediate thickness $h_o'$, it is passed to the second rolling stand 24' without shearing. The transfer bar 30' having the first intermediate thickness $h_o'$ is rolled in the second rolling stand 24', preferably without coiling as schematically illustrated, to reduce the transfer bar 30' to a second intermediate thickness $h_o''$ which is less than the first intermediate thickness $h_o'$. Preferably, the transfer bar 30' is passed back and forth through the second rolling stand 24' without coiling to reduce the thickness of the transfer bar 30' to the second intermediate thickness $h_o''$. After the transfer bar 30' has been reduced to the second intermediate thickness $h_o''$, it is then sheared into the first and second transfer bar portions 30a', 30b' and processed by the first and second rolling stands 18', 24' in a manner which is generally identical to that described above in connection with FIG. 1.

By further reducing the thickness of the transfer bar 30' in the second rolling stand 24', the total number of passes through each of the first and second rolling stands 18', 24' for each processed slab can be generally equal. By equalizing the number of passes through each rolling stand, the rolling time can be efficiently controlled, and the load distribution and power consumption of each rolling stand is evenly distributed. This is advantageous where both rolling stands are equally powerful. However, where one rolling stand is more powerful than the other, it may be advantageous to increase the number of passes through the more powerful rolling stand as compared to the less powerful rolling stand to distribute a greater load to the more powerful rolling stand.

With the foregoing description and explanation of the rolling plants 10 and 10' shown in FIGS. 1 and 2, respectively, and the first and second respective methods of the present invention as background, the description of the third through seventh methods according to the present invention will be described with respect to FIGS. 3, 4, 5–6, 7 and 8, respectively. In essence, each rolling plant illustrated in FIGS. 3 through 8 is similar to the rolling plant 10 illustrated generally in FIG. 1. For this reason, the last two digits of the identifying numbers of FIGS. 3 through 8 correspond generally to the two digits of the identifying numerals in FIG. 1. The entire descriptions of identical components therefore will not be repeated with respect to the embodiments of FIGS. 3 through 8. Identifying numerals are included in the embodiments of FIGS. 3 through 8 for ease of reference during examination, though all elements identified are not described in detail.

Figure 3:
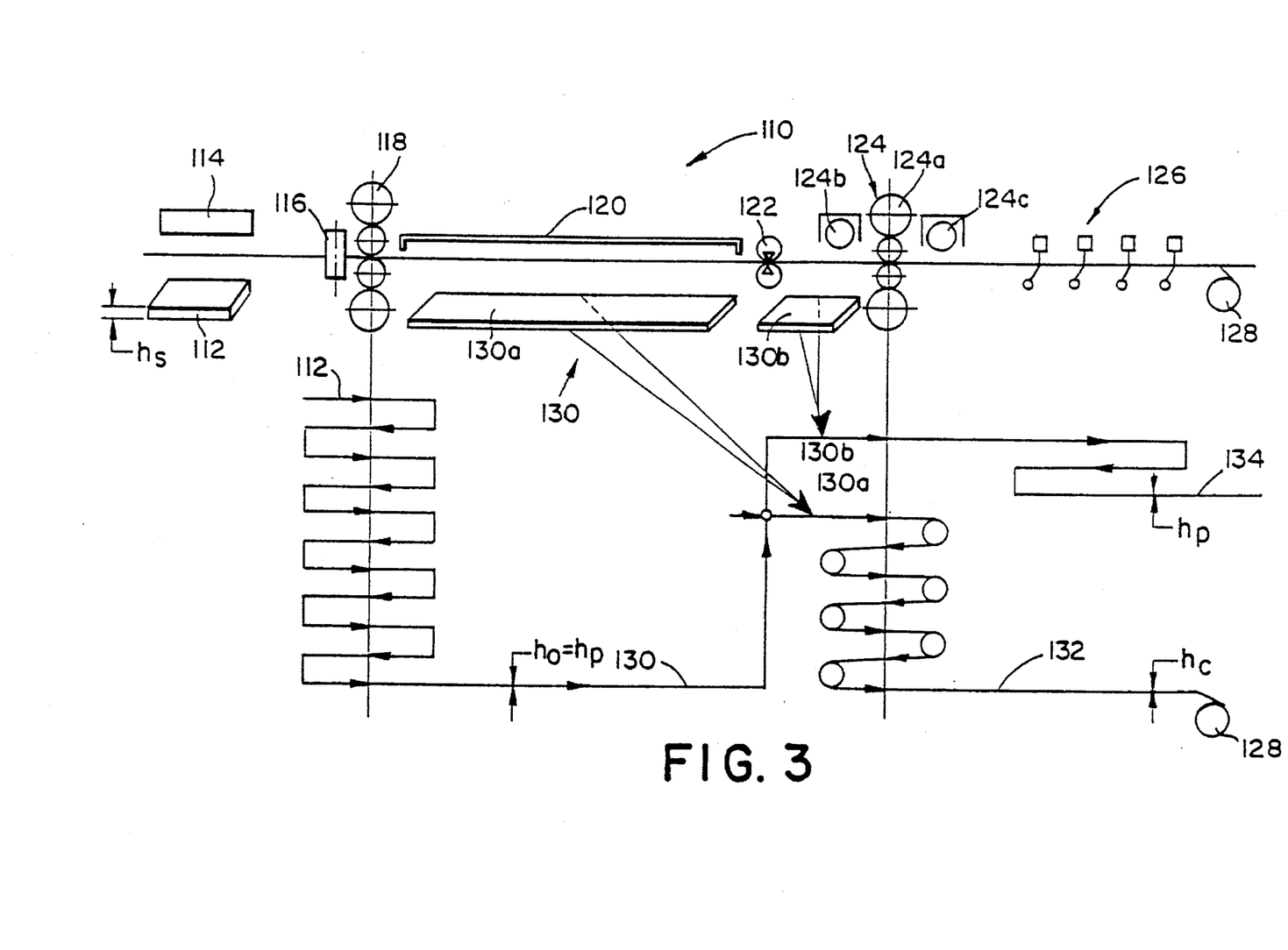
FIG. 3 is a schematic diagram, in elevational view, of a rolling plant and pass roll schedule in accordance with a third method of the present invention.

Referring now to FIG. 3, there is shown a rolling plant 110 upon which the third method of the present invention can be carried out. The third method of the present invention is generally identical to the first method of the present invention described above in connection with FIG. 1, except for the differences described below.

After the transfer bar 130 is reduced to the first thickness $h_o$, it is then sheared into the first and second transfer bar portions 130a, 130b by the shear 122. The second transfer bar portion 130b is transferred through the second rolling stand 124 without reducing the thickness of the second transfer bar portion 130b. The second transfer bar portion 130b is then in the form of the second strip 134 and is passed back and forth underneath the runout table coolant system 126 a sufficient number of passes, such as three, to cool the second strip 134 to a temperature at which it can be handled. At this point, the second strip 134 has a thickness $h_p$ which is generally equal to the thickness $h_o$ resulting from the reduction of the transfer bar 130 within the first rolling stand 118.

After the second transfer bar portion 130b is transferred through the second rolling stand 124, the first transfer bar portion 130a is then rolled in the second rolling stand 124 to reduce the first transfer bar portion 130a to a first strip 132 having a second thickness $h_c$ different from the first thickness $h_o$. The first transfer bar portion 130a is passed back and forth through the second rolling stand 124 in a manner generally identical to that described above in connection with the second transfer bar portion 30b shown and described in connection with FIG. 1. As a result, the first transfer bar portion 130a has a second thickness $h_c$ which is coilable. The rolling of the first transfer bar portion 130a in the second rolling stand 124 can be carried out simultaneously with the cooling of the second transfer bar portion 130b in the runout table coolant system 126 to increase the efficiency of the rolling plant 110.

While it is preferred that the second transfer bar portion 130b be transferred through the second rolling stand 124 without reduction, it is understood by those skilled in the art that the second transfer bar portion 130b could be rolled through the second rolling stand 124 to provide the second strip 134 with a higher quality surface finish, without departing from the spirit and scope of the invention.

Figure 4:
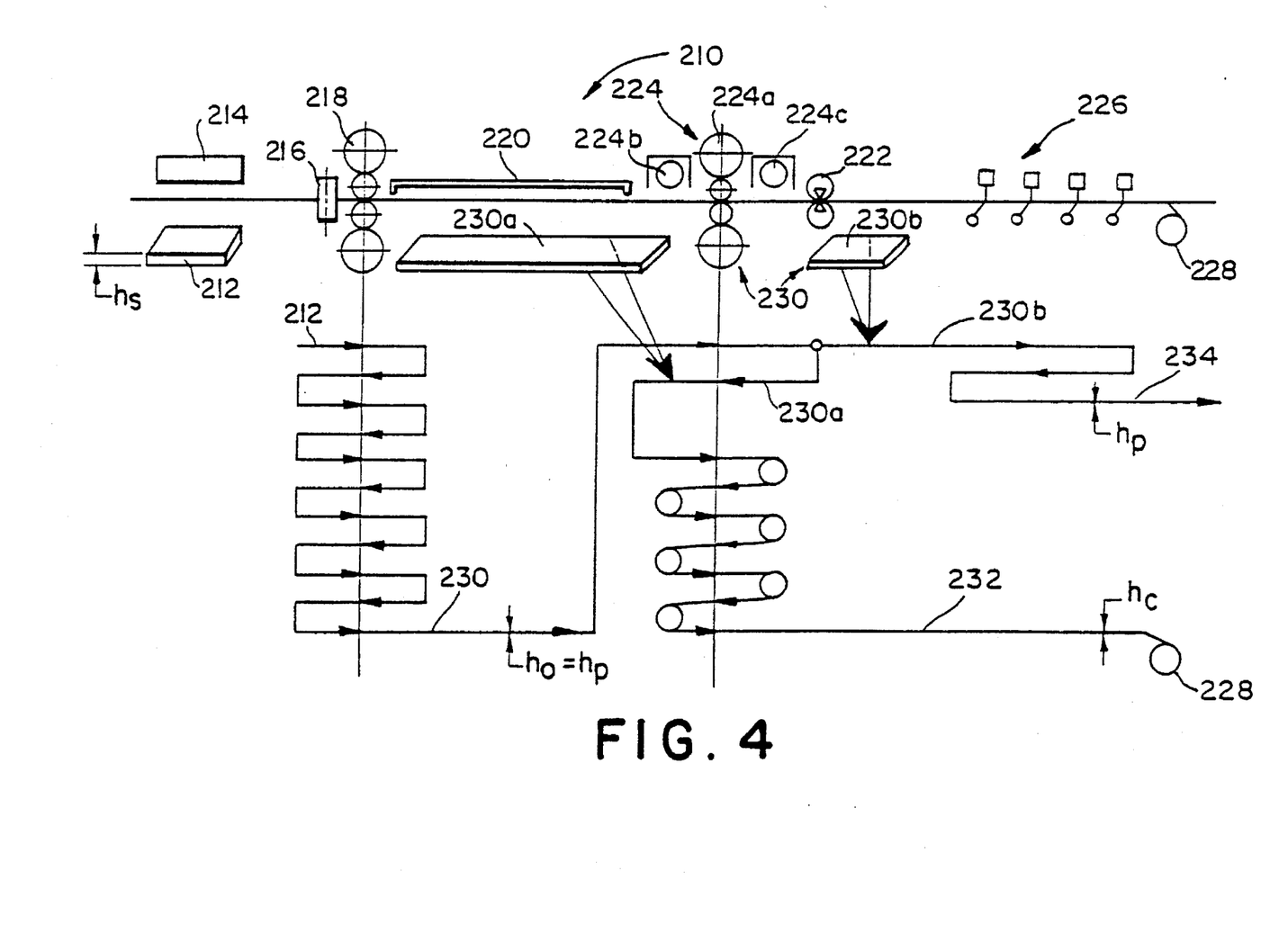
FIG. 4 is a schematic diagram, in elevational view, of a rolling plant and pass roll schedule in accordance with a fourth method of the present invention.

Referring now to FIG. 4, there is shown a rolling plant 210 which is generally identical to the rolling plant 10 shown in FIG. 1 and which is used to carry out the fourth method of the present invention, except that the shear 222 is located downstream from the second rolling stand 224 between the runout table coolant system 226 and the second rolling stand 224. The fourth method of the present invention is generally identical to the third method of the present invention described above in connection with FIG. 3, except for the differences described below.

After the transfer bar 230 exits the first rolling stand 218, and has been reduced to the first thickness $h_o$, it is transferred through the second rolling stand 224 without reducing the thickness of the transfer bar 230. After the transfer bar 230 has passed through the second rolling stand 224, it is sheared into the first transfer bar portion 230a and the second transfer bar portion 230b by the shear 222. The first and second transfer bar portions 230a, 230b are then processed by the second rolling stand 224 and cooled using the runout table coolant system 226, respectively, in a manner which is generally identical to that described above in connection with FIG. 3 and the third method, except that some of the passes through the second rolling stand 224 are carried out without coiling.

Figure 5:
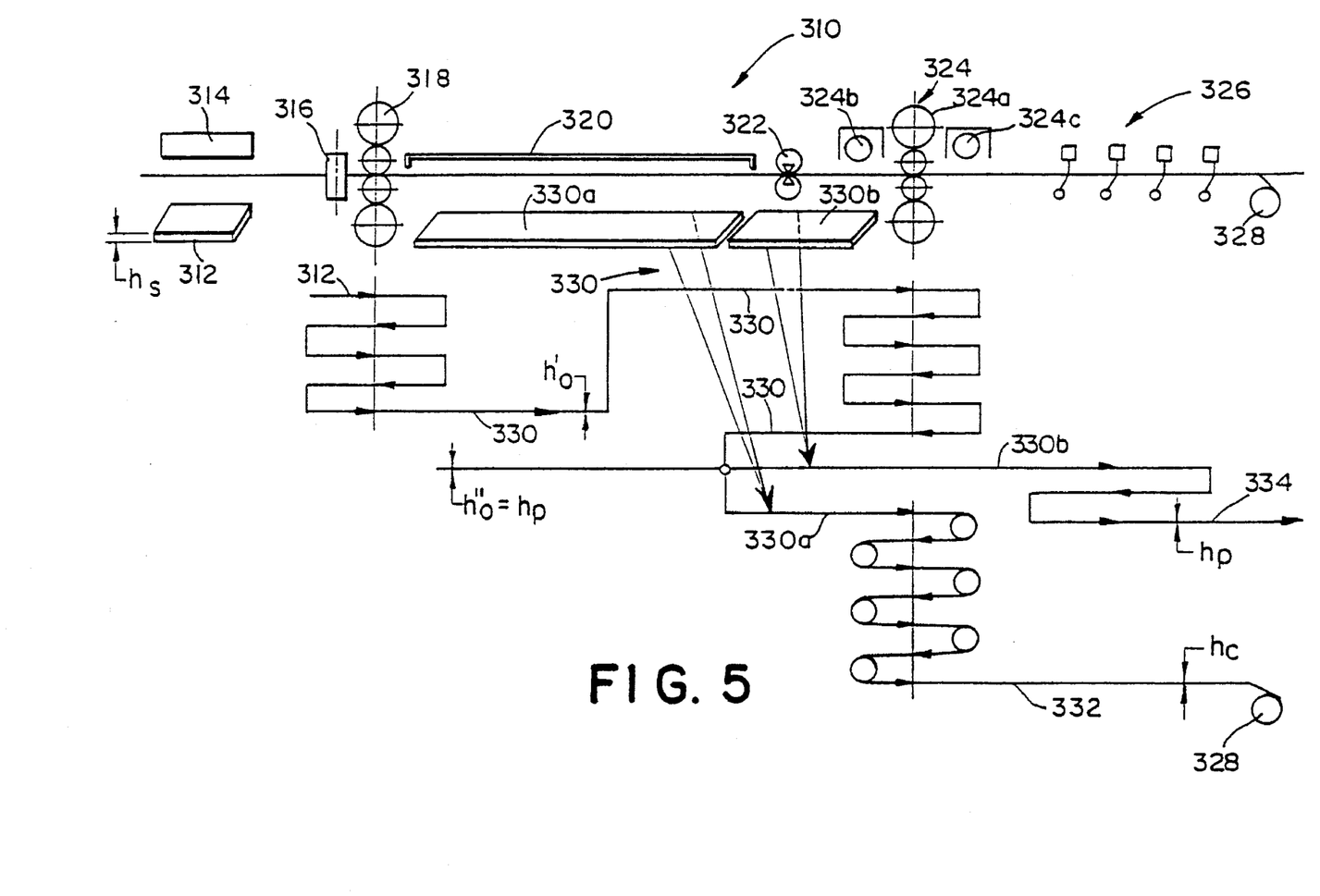
FIG. 5 is a schematic diagram, in elevational view, of a rolling plant and pass roll schedule in accordance with a fifth method of the present invention.

Referring now to FIG. 5, there is shown a rolling plant 310 upon which the fifth method of the present invention can be carried out. The fifth method of the present invention is generally identical to the third method of the present invention described above in connection with FIG. 3, except for the differences described below.

After the transfer bar 330 exits the first rolling stand 318 and has been reduced to a first intermediate thickness $h_o'$, it is passed to the second rolling stand 324 without shearing. The transfer bar 330 having the first intermediate thickness $h_o'$ is rolled back and forth in the second rolling stand 324 to reduce the transfer bar 330 to a second intermediate thickness $h_o''$ which is less than the first intermediate thickness $h_o'$. Preferably, the transfer bar 330 is passed back and forth through the second rolling stand 324 without coiling, as schematically illustrated, to reduce the thickness of the transfer bar 330 to the second intermediate thickness $h_o''$. After the transfer bar 330 has been reduced to the second intermediate thickness $h_o''$, it is then sheared into the first and second transfer bar portions 330a, 330b by the shear 322 between the first and second rolling stands 318, 324. The first transfer bar portion 330a is then processed by the second rolling stand 324 and the second transfer bar portion 330b is passed through the second rolling stand 324 and passed back and forth beneath the runout table coolant system 326 in a manner which is generally identical to that described above in connection with FIG. 3.

Figure 6:
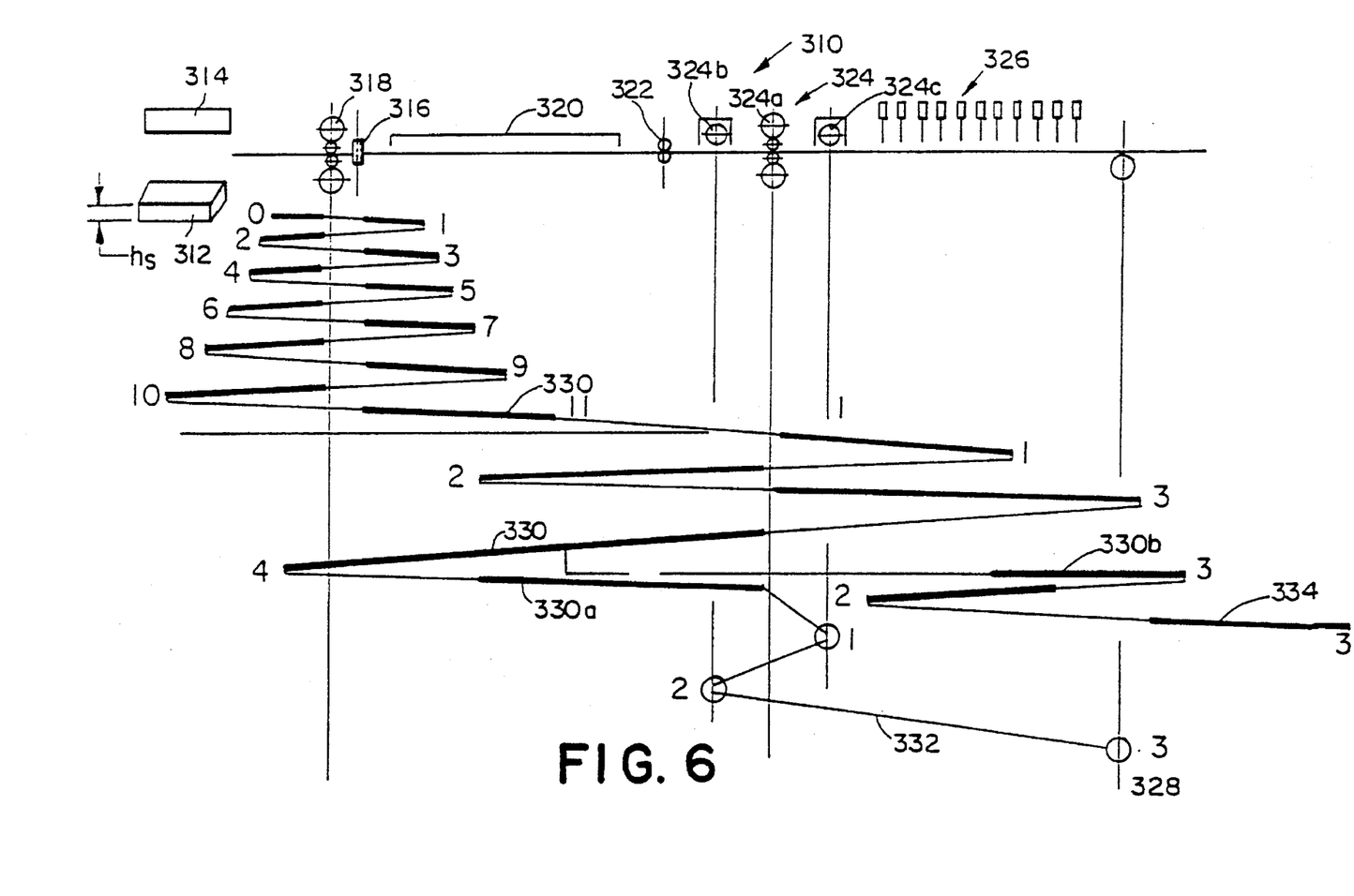
FIG. 6 is a schematic diagram, in elevational view, of the rolling plant shown in FIG. 5 and the timing of the pass roll schedule.

Referring now to FIG. 6, there is shown the rolling plant 310 which is generally identical to the rolling plant 310 shown in FIG. 5, except that the edger 316 is positioned downstream from the first rolling stand 318. Shown beneath the rolling plant 310 is an example of a proposed rolling schedule for processing a slab of metal which is about 10.7 inches thick, twenty-four feet long, 100 inches wide and weighs 40 metric tons. The slab 312 is passed back and forth through the first rolling stand 318 eleven times, as schematically illustrated in FIG. 6. The thickness and length of the slab 312 after each pass are set forth below in Table I. The pass numbers in Table I correspond to the numbers at the end of each pass schematically illustrated in FIG. 6. As can be seen from Table I, the slab is reduced from an initial thickness of about 10.7 inches to about 3.11 inches after eleven passes through the first rolling stand 318. The approximate total rolling time shown in Table I indicates the total number of seconds which have passed since the slab 312 was initially passed through the first rolling stand 318. That is, it takes approximately 172.9 seconds to complete all eleven passes.

TABLE I

Reduction of Slab 312 in First Rotting Stand 318

| Pass Number | Thickness (in.) | Length (ft.) | Approximate Total Rolling Time (sec.) |
|---|---|---|---|
| 0 | 10.7 | 24 | — |
| 1 | 9.9 | 25.9 | 6.2 |
| 2 | 9.11 | 28.2 | 19.7 |
| 3 | 8.35 | 30.8 | 33.6 |
| 4 | 7.58 | 33.9 | 47.9 |
| 5 | 6.84 | 37.5 | 62.9 |
| 6 | 6.13 | 41.9 | 78.5 |
| 7 | 5.44 | 47.2 | 95.9 |
| 8 | 4.78 | 53.7 | 112.9 |
| 9 | 4.18 | 61.4 | 131.9 |
| 10 | 3.63 | 70.7 | 151.9 |
| 11 | 3.11 | 82.6 | 172.9 |

After the slab 312 exits the first rolling stand 318 after the eleventh pass, it is in the form of a transfer bar 330. The transfer bar 330 is then passed back and forth through the second rolling stand 324 four times, as schematically illustrated in FIG. 6. As set forth in Tables I and II, the thickness of the transfer bar 330 when it initially enters the second rolling stand 324 is approximately 3.11 inches and when it exits the second rolling stand 324 after the fourth pass it is approximately 1.25 inches. The thicknesses and lengths set forth in Table II correspond to the thickness and length of the transfer bar 330 after each pass through the second rolling stand 324. The pass numbers in Table II correspond to the numbers at the end of each pass schematically illustrated as under the second rolling stand in FIG. 6. The approximate rolling times set forth in Table II refer to the time at which the transfer bar 330 entered the second rolling stand 324. That is, it takes approximately 114 seconds to complete the four passes through the second rolling stand 324.

TABLE II

Reduction of Transfer Bar 330 in Second Rolling Stand 324

| Pass Number | Thickness (in.) | Length (ft.) | Approximate Total Rolling Time (sec.) |
|---|---|---|---|
| 1 | 2.56 | 100.3 | 18.6 |
| 2 | 2.09 | 122.8 | 36.4 |
| 3 | 1.65 | 155.6 | 56.1 |
| 4 | 1.25 | 205.4 | 114.0 |

After the first transfer bar 330 is rolled through the second rolling stand 324 for the fourth time, it is sheared into the first and second transfer bar portions 330a, b by the shear 322. The second transfer bar portion 330b is then transferred through the second rolling stand 324 without rolling, such that its thickness is not reduced, and passed back and forth beneath the runout table coolant system three times. As such, the thickness and length of the second transfer bar portion 330b remain constant as it passes back and forth through the runout table coolant system 326, as shown in Table III below. The approximate rolling time set forth in Table III, refers to the time at which the second transfer bar portion 330b initially enters the second rolling stand 324. That is, it takes approximately 194 seconds for the transfer bar 330 to be processed by the second rolling stand 324, sheared into the second transfer bar portion 330b and then passed back and forth beneath the runout table coolant system 326.

TABLE III

Passing of Second Transfer Bar Portion 330b Beneath Runout Table Coolant System 326

| Pass Number | Thickness (in.) | Length (ft.) | Approximate Total Rolling/ Cooling Time (sec.) |
|---|---|---|---|
| 1 | 1.25 | 84.2 | 121 |
| 2 | 1.25 | 84.2 | 142 |
| 3 | 1.25 | 84.2 | 194.0 |

The first transfer bar portion 330a is then passed back and forth in the second rolling stand 324, while the second transfer bar portion 330b is under the runout table coolant system 326, to reduce the first transfer bar portion 330a to a first strip 332 having a thickness of approximately 0.5 inch. That is, the first transfer bar portion 330a is passed back and forth in the second rolling stand 324 a sufficient number of passes to reduce the first transfer bar portion 330a to a first strip 332 which is coilable. The first transfer bar portion 330a is coiled and heated within a coiler furnace 324b or 324c after each pass until the first transfer bar portion 330a is reduced to the coilable thickness. As set forth in Table IV below, after each pass, the thickness of the first transfer bar portion 330a is reduced. The approximate total rolling time set forth in Table IV refers to the time at which the transfer bar 330 entered the second rolling stand 324. That is, it takes approximately 271 seconds for the transfer bar 330 to be processed by the second rolling stand 324, sheared into the first transfer bar portion 330a and then again be passed back and forth in the second rolling stand 324.

TABLE IV

Reduction of First Transfer Bar Portion 330a in Second Rolling Stand 324

| Pass Number | Thickness (in.) | Length (ft.) | Approximate Total Rolling Time (sec.) |
| --- | --- | --- | --- |
| 1 | 0.9 | 168 | 175 |
| 2 | 0.657 | 230 | 221 |
| 3 | 0.5 | 303 | 271 |

The foregoing description of the pass schedule for the fifth method described above is but one prospective example of how the rolling plant 310 can be utilized to carry out the present invention. The particular number of passes in each step of the fifth method and the other methods described herein can be varied in accordance with many factors, among them the size of the slab 312 and the desired end thicknesses $h_p$ and $h_c$, in a manner well understood by those skilled in the art. Accordingly, the foregoing description of the pass schedule set forth in FIG. 6 is merely an example, and in no way limits the scope of the present invention.

Figure 7:
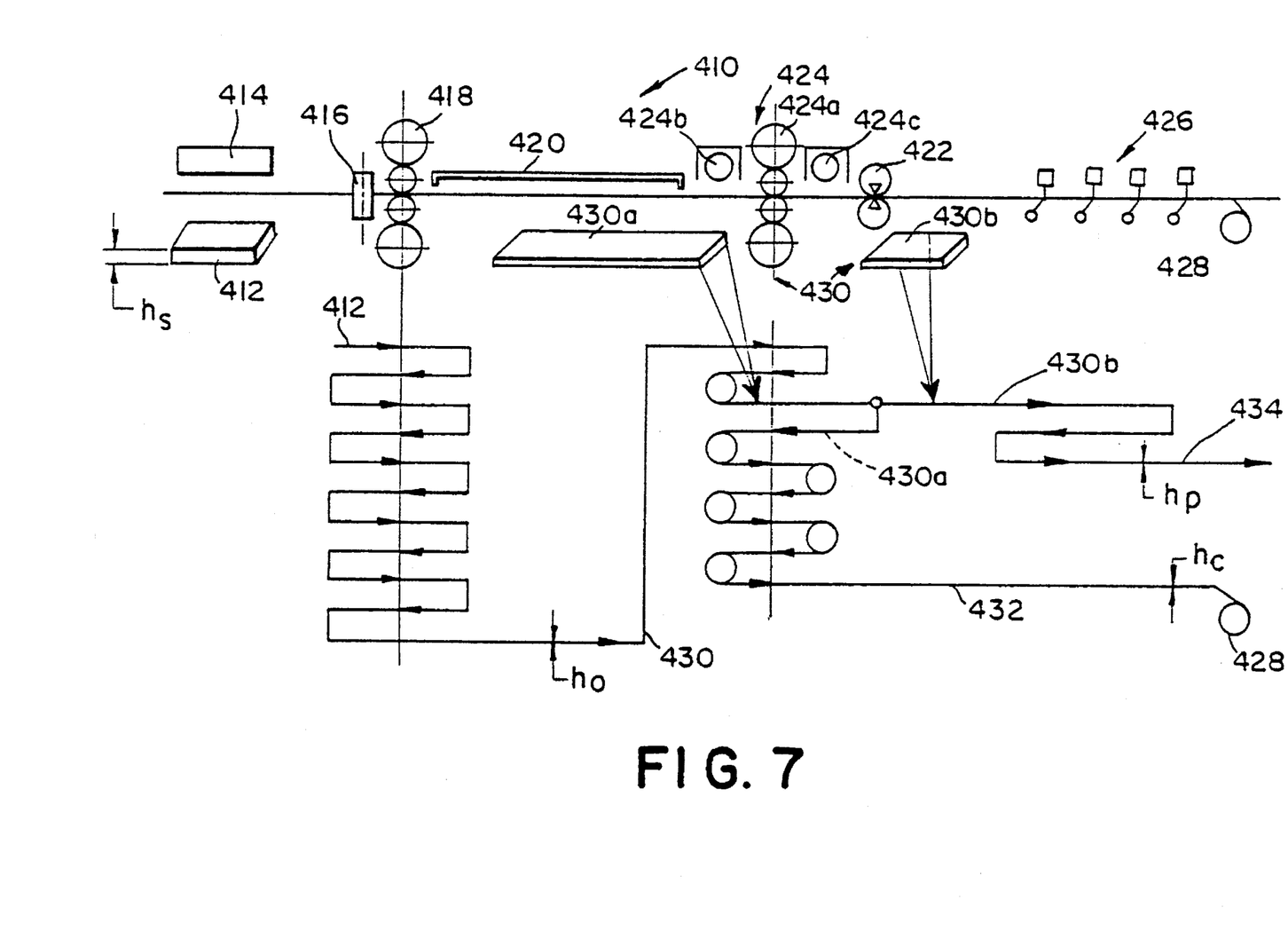
FIG. 7 is a schematic diagram, in elevational view, of a rolling plant and pass roll schedule in accordance with a sixth method of the present invention.

Referring now to FIG. 7, there is shown a rolling plant 410 which is generally identical to the rolling plant 10 shown in FIG. 1, except that the shear 422 is located downstream from the second rolling stand 424 between the second rolling stand 424 and the runout table coolant system 426. FIG. 7 schematically shows the sixth method of the present invention which is similar to the fourth method of the present invention described above in connection with FIG. 4, except for the differences described below.

In the sixth method of the present invention, the transfer bar 430 exits the first rolling stand 418 and has been reduced to a first intermediate thickness $h_o$. The transfer bar 430 is then passed to the second rolling stand 424 without shearing. The transfer bar 430 is then rolled in the second rolling stand 424 to reduce the transfer bar 430 to a second intermediate thickness $h_p$ which is less than the first intermediate thickness $h_o$. The transfer bar 430 is preferably coiled and heated within a coiler furnace 424b or 424c of the second rolling stand 424 after at least one of the passes until the transfer bar 430 is reduced to the second intermediate thickness $h_p$. More particularly, after the second pass, the transfer bar 430 is coilable and is coiled in the coiler furnace 424b. Of course, the number of passes of the transfer bar 430 through the second rolling stand 424, whether coiled or not, is selected in accordance with the characteristics of the slab 412 and desired end product.

After the transfer bar 430 exits the second rolling stand 424, it is sheared into first and second transfer bar portions 430a, 430b by the shear 422. The first transfer bar portion 430a is then transferred back through the second rolling stand 424 without reduction. The first and second transfer bar portions 430a, 430b are then processed in a manner which is generally identical to that described above in connection with FIG. 4.

Figure 8:
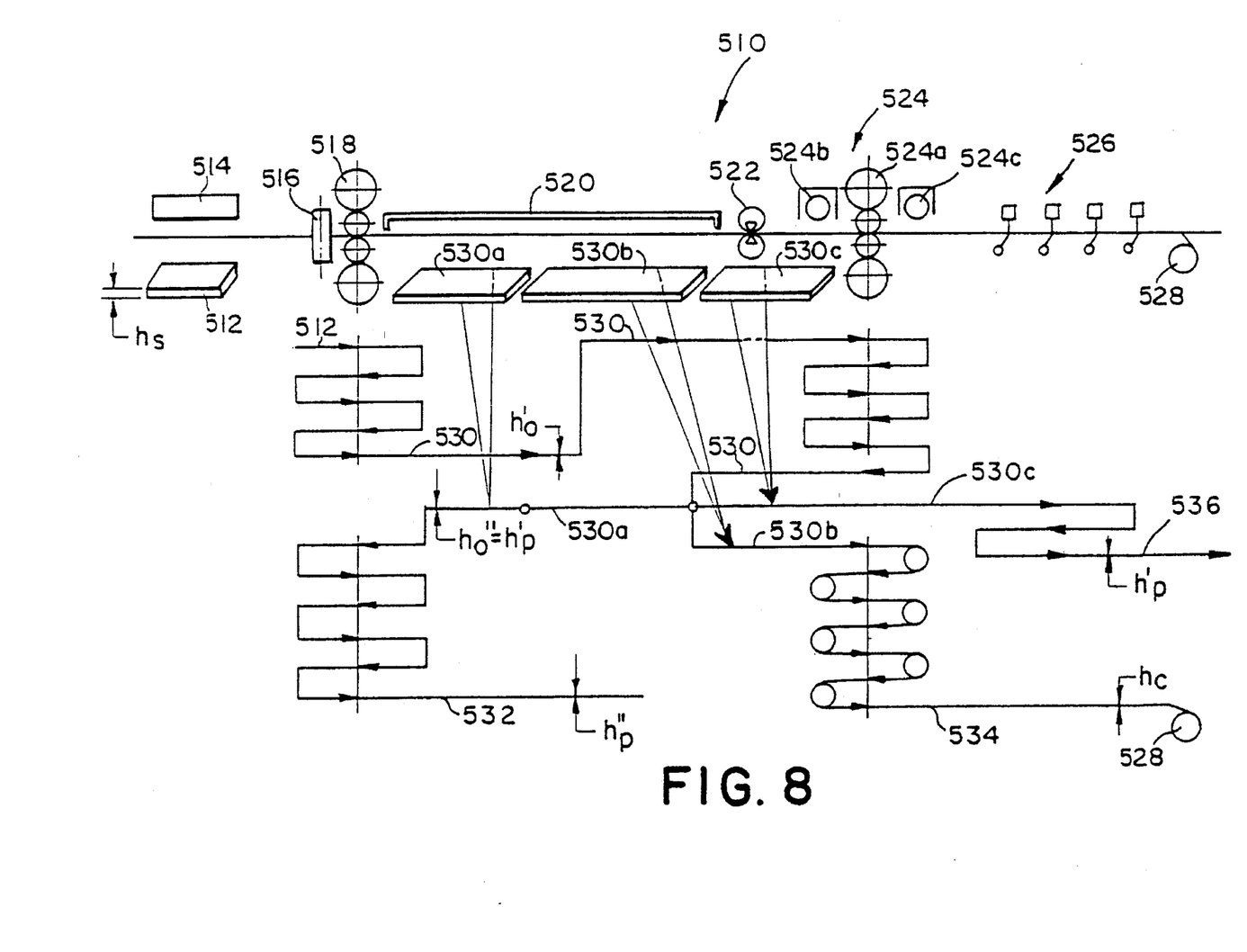
FIG. 8 is a schematic diagram, in elevational view, of a rolling plant and pass roll schedule in accordance with a seventh method of the present invention.

Referring now to FIG. 8, there is shown a rolling plant 510 upon which the seventh method of the present invention can be carried out. The seventh method of the present invention is schematically depicted in FIG. 8 and is generally identical to the second method of the present invention described above, except for the differences described below.

After the first transfer bar 530 exits the second rolling stand 524 and has been reduced to the second intermediate thickness $h_o''$, it is then sheared into first, second and third transfer bar portions 530a, 530b and 530c, respectively. The first and second transfer bar portions 530a, 530b are processed by the first and second rolling stands 518, 524 in a manner which is generally identical to that described above in connection with FIG. 2. Prior to rolling the second transfer bar portion 530b in the second rolling stand 524, the third transfer bar portion 530c is transferred through the first rolling stand 524, without reduction, and passed back and forth underneath the runout table coolant system 526 a number of times, as described above in connection with the second transfer bar portion 330b shown in FIG. 5, to produce a third strip 536 having a third thickness $h_p'$.

While the foregoing description of the first through seventh methods applies generally to the rolling plants shown in the drawings, those skilled in the art will understand in view of this disclosure that the first through seventh methods are equally applicable to other rolling plants which include different types of rolling stands or other elements, without departing from the spirit and scope of the invention.

It will be appreciated by those skilled in the art that changes could be made to the methods described above without departing from the broad inventive concepts thereof. It is understood, therefore, that this invention is not limited to the particular methods disclosed, but it is intended to cover modifications within the scope and spirit of the present invention as defined by the appended claims.

I claim:

1. A method for producing metal strips having different thicknesses from a single slab of metal having a thickness greater than that of the strips comprising the steps of (a) rolling the slab in a first rolling stand to reduce the slab thickness to produce a transfer bar having a first thickness;

(b) shearing the transfer bar into first and second transfer bar portions;

(c) rolling the first transfer bar portion in a second rolling stand to reduce the first transfer bar portion to a first strip having a second thickness different from the first thickness; and (d) passing the second transfer bar portion through the second rolling stand without reducing the thickness of the second transfer bar portion.

2. A method for producing metal strips having different thicknesses from a single slab of metal having a thickness greater than that of the strips comprising the steps of (a) rolling the slab in a first rolling stand to reduce the slab thickness to produce a transfer bar having a first intermediate thickness;

(b) rolling the transfer bar in a second rolling stand to reduce the transfer bar to a second intermediate thickness which is less than the first intermediate thickness;

(c) shearing the transfer bar into first and second transfer bar portions while the transfer bar is between the first and second rolling stands;

(d) rolling the first transfer bar portion in the second rolling stand to reduce the first transfer bar portion to a first strip having a thickness different from the second intermediate thickness; and (e) passing the second transfer bar portion through the second rolling stand without reducing the thickness of the second transfer bar portion.

3. A method for producing metal strips having different thicknesses from a single slab of metal having a thickness greater than that of the strips comprising the steps of (a) rolling the slab in a first rolling stand to reduce the slab thickness to produce a transfer bar having a first intermediate thickness;

(b) rolling the transfer bar in a second rolling stand to reduce the transfer bar to a second intermediate thickness which is less than the first intermediate thickness;

(c) shearing the transfer bar into first, second and third transfer bar portions;

(d) rolling the first transfer bar portion in the first rolling stand to reduce the first transfer bar portion to a first strip having a first thickness; and (e) rolling the second transfer bar portion in the second rolling stand to reduce the second transfer bar portion to a second strip having a second thickness different from the first thickness.

4. A method as recited in claim 3, further comprising the step of:

(f) passing the third transfer bar portion through the second rolling stand without reducing the thickness of the third transfer bar portion.

5. A method as recited in claim 3, wherein in step (a) the first rolling stand is a reversing rolling stand and the slab is passed back and forth through the first rolling stand to reduce the slab thickness to produce the transfer bar having the first intermediate thickness.

6. A method as recited in claim 3, wherein in step (d) the first rolling stand is a reversing rolling stand and the first transfer bar portion is passed back and forth through the first rolling stand a sufficient number of passes to reduce the first transfer bar portion to a first strip which is in the form of a plate having the first thickness.

7. A method as recited in claim 3 wherein in step (e) the second transfer bar portion is passed back and forth through the second rolling stand a sufficient number of passes to reduce the second transfer bar portion to a second strip having a second thickness, such that the second strip is coilable.

8. A method as recited in claim 7, wherein in step (e) the second transfer bar portion is coiled and heated within a coiler furnace after each pass until the second transfer bar portion is reduced to the second thickness.

9. A method as recited in claim 3, wherein in at least portions of steps (d) and (e) are carried out simultaneously.

10. A method as recited in claim 3, wherein in step (b) the second rolling stand is a reversing rolling stand and the transfer bar is passed back and forth through the second rolling stand to reduce the transfer bar to the second intermediate thickness.

* * * * *